(12) United States Patent
Seo et al.

(10) Patent No.: US 10,785,617 B2
(45) Date of Patent: Sep. 22, 2020

(54) CONTEXT AWARENESS SYSTEM, METHOD AND COMPUTER-READABLE RECORDING MEDIUM FOR PROVIDING SMART SERVICE IN INTERNET OF THINGS ENVIRONMENT

(71) Applicant: SAMJIN LND CO., LTD, Hwaseong-si (KR)

(72) Inventors: EunSeok Seo, Seoul (KR); BoRam Han, Seoul (KR); JungGyu Kim, Gwangju-si (KR)

(73) Assignee: SAMJIN LND CO., LTD., Hwaseong-si (KR)

( * ) Notice: Subject to any disclaimer, the term of this patent is extended or adjusted under 35 U.S.C. 154(b) by 212 days.

(21) Appl. No.: 15/759,440

(22) PCT Filed: Jun. 21, 2017

(86) PCT No.: PCT/KR2017/006510
§ 371 (c)(1),
(2) Date: Mar. 12, 2018

(87) PCT Pub. No.: WO2017/222294
PCT Pub. Date: Dec. 28, 2017

(65) Prior Publication Data
US 2018/0184267 A1 Jun. 28, 2018

(30) Foreign Application Priority Data
Jun. 21, 2016 (KR) .................. 10-2016-0077528

(51) Int. Cl.
*H04W 4/38* (2018.01)
*H04L 29/08* (2006.01)
(Continued)

(52) U.S. Cl.
CPC .......... *H04W 4/38* (2018.02); *H04L 41/0803* (2013.01); *H04L 67/12* (2013.01); *H04L 67/16* (2013.01); *H04W 4/70* (2018.02); *H04L 67/125* (2013.01)

(58) Field of Classification Search
CPC . H04L 67/146; H04L 67/141; H04L 41/0803; H04L 67/12; H04L 67/16; H04L 67/125; H04W 4/38; H04W 4/70
See application file for complete search history.

(56) References Cited

U.S. PATENT DOCUMENTS 10,324,773 B2 * 6/2019 Wing .................. G06Q 10/10
2017/0006141 A1 * 1/2017 Bhadra ................ H04W 84/18

FOREIGN PATENT DOCUMENTS

KR  10-2014-0076013 A  6/2014
KR  10-2014-0098597 A  8/2014
(Continued)

*Primary Examiner* — Azizul Choudhury
(74) *Attorney, Agent, or Firm* — Korus Patent, LLC; Seong Il Jeong

(57) ABSTRACT

Context-aware system, method, and computer-readable recording medium for providing an intelligent service in an Internet of Things (IoT) environment are provided. The context-aware system includes a plurality of IoT devices, each including at least one sensor and a communication unit, a gateway connected to the plurality of IoT devices and including at least one gateway device connected to an Internet network, and a cloud server layer which transmits and receives data to and from the plurality of IoT devices through the Internet network and the gateway, wherein at least one IoT device, which cannot perform a context-aware processing process in real time, generates context information, and transmits it to a context-aware server of the cloud server layer. The context-aware server performs the context-aware processing process of the IoT device to generate
(Continued)

context-aware result information, and transmits the result information back to the IoT device.

10 Claims, 10 Drawing Sheets

(51) Int. Cl.
  *H04W 4/70* (2018.01)
  *H04L 12/24* (2006.01)

(56) References Cited

FOREIGN PATENT DOCUMENTS

| KR | 10-2014-0110529 A | 9/2014 |
| KR | 10-2016-0009614 A | 1/2016 |
| KR | 10-2016-0016541 A | 2/2016 |

* cited by examiner

CONTEXT AWARENESS SYSTEM, METHOD AND COMPUTER-READABLE RECORDING MEDIUM FOR PROVIDING SMART SERVICE IN INTERNET OF THINGS ENVIRONMENT

TECHNICAL FIELD

The present invention relates to a context-aware system, and more particularly, to a context-aware system, method, and computer-readable recording medium for providing an intelligent service in an Internet of Things (IoT) environment, capable of supporting real-time processing of data for context awareness, without imposing limitations on specification of each IoT device in the IoT environment.

BACKGROUND ART

Internet of Things (IoT) refers to a system or a network system in which things with built-in sensors are connected to one another to provide more than the sum of information of devices existing as individual objects. The IoT environment includes a service, an IoT device, and a platform, and provides various services by interworking among components through connectivity provided among the components. The platform has to meet the following three requirements.

First, it should be able to provide a service that can fully support a user's tangible/intangible environment.

Second, it should be able to collect information about contexts occurring in a user's surrounding environment at any time.

Third, it should be able to support so that communication between a user and each component can be smoothly performed at any time.

On the other hand, in the conventional IoT environment, each IoT device has a limitation in its own specification, and thus it is impossible to perform data processing for context awareness in real time.

In addition, in the conventional IoT environment, each IoT device is connected to a server through a gateway connected to an Internet network, and the operation of each IoT device is controlled by the connected server. When data transmission and reception connection between each IoT device and the server is disconnected, each IoT device cannot provide its unique operation to a user. This is not very efficient and it takes much time to launch a service to be provided to a user.

Therefore, there is a need for an efficient mechanism for configuring an IoT environment which can process data for context awareness in real time and can allow each IoT device to provide a service to a user according to context.

DETAILED DESCRIPTION OF THE INVENTION

Technical Problem

One embodiment of the present invention provides a context-aware system, method, and computer-readable recording medium for providing an intelligent service in an Internet of Things (IoT) environment, capable of supporting real-time processing of data for context awareness, without imposing limitations on specification of each IoT device in the IoT environment.

In addition, another embodiment of the present invention provides a context-aware system, method, and computer-readable recording medium for providing an intelligent service in an IoT environment, in which when data transmission and reception between IoT devices and a server is disconnected in an IoT environment, the IoT devices form an IoT network through a gateway, and data for context awareness is processed through the formed IoT network and serviced to a user.

Technical Solution

According to an aspect of the present invention, a context-aware system for providing an intelligent service in an Internet of things (IoT) environment includes: a plurality of IoT devices, each including at least one sensor and a communication unit; a gateway connected to the plurality of IoT devices to form an IoT network layer and including at least one gateway device connected to an Internet network; and a cloud server layer which transmits and receives data to and from the plurality of IoT devices of the IoT network layer through the Internet network and the gateway, wherein at least one IoT device, which cannot perform a context-aware processing process in real time among the plurality of IoT devices, generates context information, which is an essential component of the context-aware processing process, and transmits the generated context information to a context-aware server of the cloud server layer, and the context-aware server performs the context-aware processing process of the IoT device transmitted the context information to generate context-aware result information as result data, transmits the generated context-aware result information back to the IoT device transmitted the context information, and provides support so that the IoT device receiving the context-aware result information performs at least one operation corresponding to the received context-aware result information.

Each of the plurality of IoT devices may include: a sensor unit including at least one sensor; a communication unit connected to a gateway device of the gateway through a wired/wireless communication scheme to transmit and receive data with the cloud layer; a storage unit which previously stores at least one of sensing period information indicating a period for controlling the operation of the at least one sensor to acquire sensing data, context-aware regulation information indicating reference regulations referred to for the context-aware processing process, a real-time processing threshold value which is a reference value when it is determined that the context-aware processing process cannot be processed in real time, standardized interface information for adjusting characteristics of the at least one sensor, and ID information which is unique identification information that can be distinguished from other IoT devices; and a control unit which acquires the sensing data from the at least one sensor according to the sensing period information, distributes the acquired sensing data to at least one other IoT device or the cloud layer through the communication unit, generates a context tile, which is smallest unit data among context information, based on current sensing data, previous sensing data, and the context-aware regulation information acquired from the at least one sensor, generates context information including the generated context tile to distribute the generated context information to other IoT device or the cloud layer, generates context-aware result information as result data, by performing a context-aware processing process based on the generated context information, determines at least one operation information corresponding to the generated context-aware result information among a plurality of operation information previously stored in the storage unit, and controls an operation corresponding to the determined at least one operation information to be performed.

The control unit may receive sensing data and context information generated by at least one other IoT device in the IoT network layer, and may further refer to the received sensing data and context information of the at least one other IoT device in generating the context tile or performing the context-aware processing process.

When control information is received from a control server of the cloud layer, the control unit may perform at least one operation indicated by at least one operation information corresponding to the received control information among the plurality of operation information previously stored in the storage unit, generate result information indicating the result of performing the at least one operation, and transmit the result information to the control server.

When it is determined that the context-aware processing process cannot be performed in real time, the control unit may determine a connection state with respect to the cloud layer, transmit the generated context information to the at least one other IoT device or the at least one gateway device to perform the context-aware processing process by proxy when it is determined that the connection is disconnected, and acquire context-aware result information generated by the at the at least one other IoT device or the at least one gateway device.

The cloud layer may include: a data storage which receives and stores sensing data and context information transmitted from the plurality of IoT devices; an external data collection crawler which collects external data opened through the Internet network and supports the external data to be stored in the data storage; and a context-aware server which, when the context information is received from at least one of the plurality of IoT devices, generates context-aware result information as result data, by performing a context-aware processing process of the IoT device transmitted the context information based on information stored in the data storage, and transmits the generated context-aware result information to the IoT device transmitted the context information.

The external data collection crawler may generate cleaned external data by selecting data that can be referred to among the collected external data when the context-aware server performs the context-aware processing process of the IoT device transmitted the context information, and support the cleaned external data to be stored in the data storage.

The context-aware system may further include a control server which, when administrator command information is received from at least one of the plurality of IoT devices, generates control information corresponding to the received administrator command information, transmits the generated control information to the at least one IoT device transmitted the administrator command information, and supports at least one operation corresponding to the control information to be performed.

The control server may receive result information indicating a result of performing the operation from the at least one IoT device received the control information, and support the received result information to be stored in the data storage so that the context-aware server can refer to the received result information in performing the context-aware processing process of the IoT device transmitted the context information.

According to another aspect of the present invention, a context-aware method for providing an intelligent service in an Internet of things (IoT) environment includes: a context-aware real-time processing possibility/impossibility determining process of determining whether the IoT device can perform the context-aware processing process in real time; a context information processing process of, when it is determined that the context-aware processing process cannot be performed in real time, generating context information for context-aware processing, and transmitting the generated context information to other electronic device in real time; a context-aware result information receiving process of receiving context-aware result information as result data for a context-aware processing process performed by the other electronic device; and a context-aware result information correspondence operation process of determining at least one piece of operation information corresponding to the received context-aware result data among a plurality of previously stored operation information and performing an operation corresponding to the determined at least one piece of operation information.

The context-aware real-time processing possibility/impossibility determining process may include determining whether a degree of a load occurring according to current data processing exceeds a previously stored real-time processing threshold value.

The context information processing process may further include: a context information generating process of generating the context information for the context-aware processing; a cloud layer connection state determining process of determining a connection state for data transmission and reception with a cloud layer; a first context information transmitting process of, when the connection for the data transmission and reception with the cloud layer is disconnected, transmitting the context information to at least one of other IoT devices of an IoT network layer or gateway devices of a gateway; and a second context information transmitting process of, when it is determined that the connection for the data transmission and reception with the cloud layer is normal, transmitting the context information to the cloud layer.

The context information generating process may generate the context information including at least one of previously stored ID information, a context tile, which is smallest unit data among the context information, generated for the context-aware processing process, and sensing data acquired in real time by a sensor unit.

According to another aspect of the present invention, a context-aware method for providing an intelligent service in an Internet of things (IoT) environment includes: an Internet of Things (IoT) network layer information collecting process of collecting, by a data storage of a cloud layer, sensing data and context information transmitted from an IoT network layer; an external data processing process of collecting, by an external data collection crawler of the cloud layer, external data opened to the public through an Internet network, cleaning the external data, and generating cleaned external data with result data; a context information reception/non-reception determining process of determining, by a context-aware server of the cloud layer, whether context information has been received from at least one IoT device of the IoT network layer; a context-aware processing process of, when the context information has been received, performing, by the context-aware server, a context-aware processing process of at least one IoT device having transmitted the context information by referring to information stored in the data storage; and a context-aware result information generating and transmitting process of generating, by the context-aware server, context-aware result information which is result data of the context-aware processing process, and transmitting the generated context-aware result information to at least one IoT device transmitted the context information.

The context-aware processing process may include referring to, by the context-aware server, at least one of sensing data of each IoT device of the IoT network layer previously stored in the data storage, a context tile which is smallest unit data among context information, cleaned external data, and context-aware result information which is result data of an existing context-aware processing process.

The context-aware method may further include: an administrator command information reception/non-reception determining process of determining, by a control server of the cloud layer, whether administrator command information has been received from at least one IoT device of the IoT network layer; and a control information generating and transmitting process of, when the command information is received, generating, by the control server, control information of the IoT device transmitted the administrator command information, transmitting the generated control information to the IoT device transmitted the administrator command information, and supporting the IoT device transmitted the administrator command information to perform an operation corresponding to the received administrator command information.

The context-aware method may further include, after the control information generating and transmitting process, a result information processing process of receiving, by the control server, whether the operation corresponding to the control information is performed and result information indicating a result of performing the operation from the IoT device received the control information, and supporting the received result information to be stored in the data storage so that the context-aware server can refer to the received result information in performing the context-aware processing process of the IoT device transmitted the administrator command information.

Meanwhile, information about the context-aware method for providing the intelligent service in the IoT environment may be stored in a computer-readable recording medium. The computer-readable recording medium may be any recording medium that can store the program and data which can be thereafter read by a computer system. Examples of the computer-readable recording medium may include ROM, RAM, CDs, DVD-ROMs, magnetic tapes, floppy disks, optical data storage devices, and embedded multimedia cards. The computer-readable recording medium may also be distributed over network-coupled computer systems so that the computer-readable code is stored and executed in a distributed fashion.

Advantageous Effects

According to an embodiment of the present invention, after a cloud layer performs a context-aware process of an Internet of Things (IoT) device of an IoT layer, which cannot perform a real-time context-aware process due to limitation of its specification, context-aware result information is provided to the corresponding IoT device, so that each IoT device of the IoT layer can perform a real-time context-aware process.

In addition, according to an embodiment of the present invention, each IoT device of an IoT layer can provide a service to a user based on context-aware result information, which is processed in real time regardless of limitation of its own specification.

Furthermore, according to an embodiment of the present invention, even when a connection between an IoT layer and a cloud layer is disconnected, each IoT device of an IoT layer can perform a real-time context-aware process in an IoT network formed through a gateway.

BEST MODE

Figure 1:
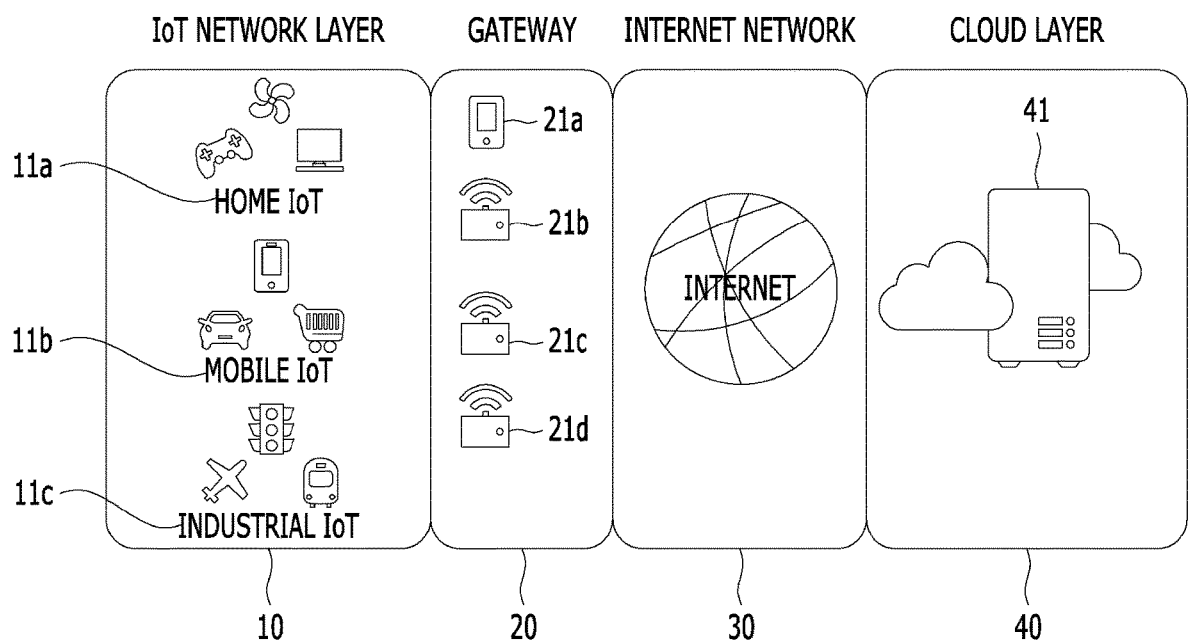
FIG. 1 is a diagram illustrating a context-aware system for providing an intelligent service in an Internet of Things (IoT) environment according to an embodiment of the present invention.

In the following detailed description of the present invention, references are made to the accompanying drawings that show, by way of illustration, specific embodiments in which the present invention may be implemented. These embodiments are described in sufficient detail to enable those skilled in the art to implement the present invention. It should be understood that various embodiments of the present invention, although different, are not necessarily mutually exclusive. For example, specific features, structures, and characteristics described herein, in connection with one embodiment, may be implemented within other embodiments without departing from the spirit and scope of the present invention. In addition, it should be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range equivalent to what the claims claim. In the drawings, like reference numbers refer to the same or similar function in many ways.

It will be understood that although the terms "first," "second," etc. may be used herein to describe various components, these components should not be limited by these terms. These components are only used to distinguish one component from another. For example, a first component may be named a second component without departing from the scope of the inventive concept. Similarly, a second component may be named a first component.

The terminology used herein is for the purpose of describing particular embodiments only and is not intended to limit the present invention. As used herein, the singular forms "a," "an" and "the" are intended to include the plural forms as well, unless the context clearly indicates otherwise. It will be understood that the terms "comprise," "include," and "have" used herein specify the presence of stated features, integers, steps, operations, elements, components, or combinations thereof, but do not preclude the presence or addition of one or more other features, integers, steps, operations, elements, components, or combinations thereof.

Unless otherwise defined, all terms including technical and scientific terms used herein have the same meaning as commonly understood by those of ordinary skill in the art to which the inventive concept belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, embodiments will be described in detail with reference to the accompanying drawings. The following embodiments are provided so that this disclosure will be thorough and complete and will fully convey the present invention to those of ordinary skill in the art.

FIG. 1 is a diagram illustrating a context-aware system for providing an intelligent service in an Internet of Things (IoT) environment according to an embodiment of the present invention.

Referring to FIG. 1, a context-aware system 50 for providing an intelligent service in an IoT environment according to an embodiment of the present invention may include an IoT network layer 10, a gateway 20, an Internet network 30, and a cloud layer 40.

The IoT network layer 10 may include a plurality of IoT devices 11 (11a, 11b, 11c). The plurality of IoT devices 11 may be connected to at least one gateway device 21a, 21b, 21c, and 21d of the gateway 20 to form an IoT network.

Meanwhile, while context-aware data processing performed by at least one context-aware server 41 of the cloud layer 40 is a heavy computation task, each of the IoT devices 11a, 11b, and 11c of the IoT network layer 10 can perform a light computation task, that is, context-aware data processing of each of the IoT devices 11a, 11b, and 11c. This is because each of the IoT devices 11a, 11b, and 11c of the IoT network layer 10 has a very low level of computing performance and a small amount of memory, as compared with at least one context-aware server 41 of the cloud layer 40.

The gateway 20 may include at least one gateway device 21 (21a, 21b, 21c, 21d) connected to the Internet network 30.

The gateway device 21 may intermediate data transmission and reception between the plurality of IoT devices 11 of the IoT network layer 10 and at least one context-aware server 41 of the cloud layer 40.

More specifically, the gateway device 21 may be connected to at least one context-aware server 41 of the cloud layer 40 through the Internet network 30. The plurality of IoT devices 11 of the IoT network layer 10 may be connected to at least one context-aware server 41 of the cloud layer 40 through the gateway device 21 to perform data transmission and reception.

In addition, the gateway device 21 can provide the IoT network so that data transmission and reception among the IoT devices 11 connected to the gateway device 21 are performed. At this time, the gateway device 21 can support the IoT devices 11a, 11b, and 11c of the IoT network layer 10 to process context-aware data thereof in real time.

More specifically, each of the IoT devices 11a, 11b, and 11c of the IoT network layer 10 may form an IoT network such as a mesh network through the gateway device 21.

In addition, when the gateway device 21 includes a sensor unit (not illustrated), the gateway device 21 may perform a context-aware processing process like the IoT device 11. That is, the gateway device 21 is responsible for data transmission and reception between each of the IoT devices 11a, 11b, and 11c of the IoT network layer 10 and the cloud layer 40 and may operate as one IoT device.

When the communication connection between the gateway device 21 and the Internet network 30 is disconnected, the gateway device 21 may support each of the IoT devices 11a, 11b, and 11c to perform context-aware data thereof in real time in the formed IoT network. More specifically, since the gateway device 21 generally has a specification with higher computing capability than each of the IoT devices 11a, 11b, and 11c of the IoT network layer 10, the gateway device 21 may perform a context-aware processing process of the IoT device, which cannot perform a context-aware processing process in real time, may generate result data, and may provide the data to the IoT device device which cannot perform the context-aware processing process in real time.

The cloud layer 40 may include at least one context-aware server 41 and may include a cloud server.

In addition, the context-aware server 41 of the cloud layer 40 may include one master server (not illustrated) and at least one slave server (not illustrated) connected to the master server. The master server and the slave server may exist in one electronic device, or may exist as separate electronic devices, respectively. For example, the context-aware server 41 may monitor whether the amount of context information received from each of the IoT devices 11a, 11b, and 11c of the IoT network layer 10, which is to be processed in real time, exceeds a preset real-time data processing reference amount. The context information may mean information used in the context-aware processing process performed by the context-aware server 41.

As a result of the monitoring, when it is determined that the amount of context information transmitted in real time from each of the IoT devices 11a, 11b, and 11c of the IoT network layer 10 to the context-aware server 41 exceeds the predetermined real-time data processing reference amount, the context-aware server 41 may designate at least one other server as the slave server, and then transmit the received context information to the slave server, thereby sharing the burden of data processing with the slave server. The existing context-aware server 41 may have rights to the context-aware processing process by transmitting the received context information to at least one slave server and collect the result data generated through the context-aware processing process from each slave server. That is, the context-aware server 41 may operate as the master server. Meanwhile, at least one other server that has shared data processing with the master server may operate as the slave server.

The context-aware server 41 may transmit and receive data to and from each of the IoT devices 11a, 11b, and 11c of the IoT network layer 10 through the gateway device 21 of the gateway 20 connected to the Internet network 30.

In addition, the context-aware server 41 may receive context information necessary for the context-aware processing process, in real time, from each of the IoT devices 11a, 11b, and 11c of the IoT network layer 10.

Then, the context-aware server 41 may perform the context-aware processing process with reference to the context information received from each of the IoT devices 11a, 11b, and 11c. Here, in performing the context-aware processing process, the context-aware server 41 may refer to existing context-aware processing result data stored in a data storage such as a data archive.

Then, the context-aware server 41 may generate result data by performing the context-aware processing process, and transmit the generated result data back to each of the IoT devices 11a, 11b, and 11c of the IoT network layer 10. In addition, the context-aware server 41 may transmit the result data to the connected data storage to support the updating of the previously stored context-aware processing result data.

Figure 2:
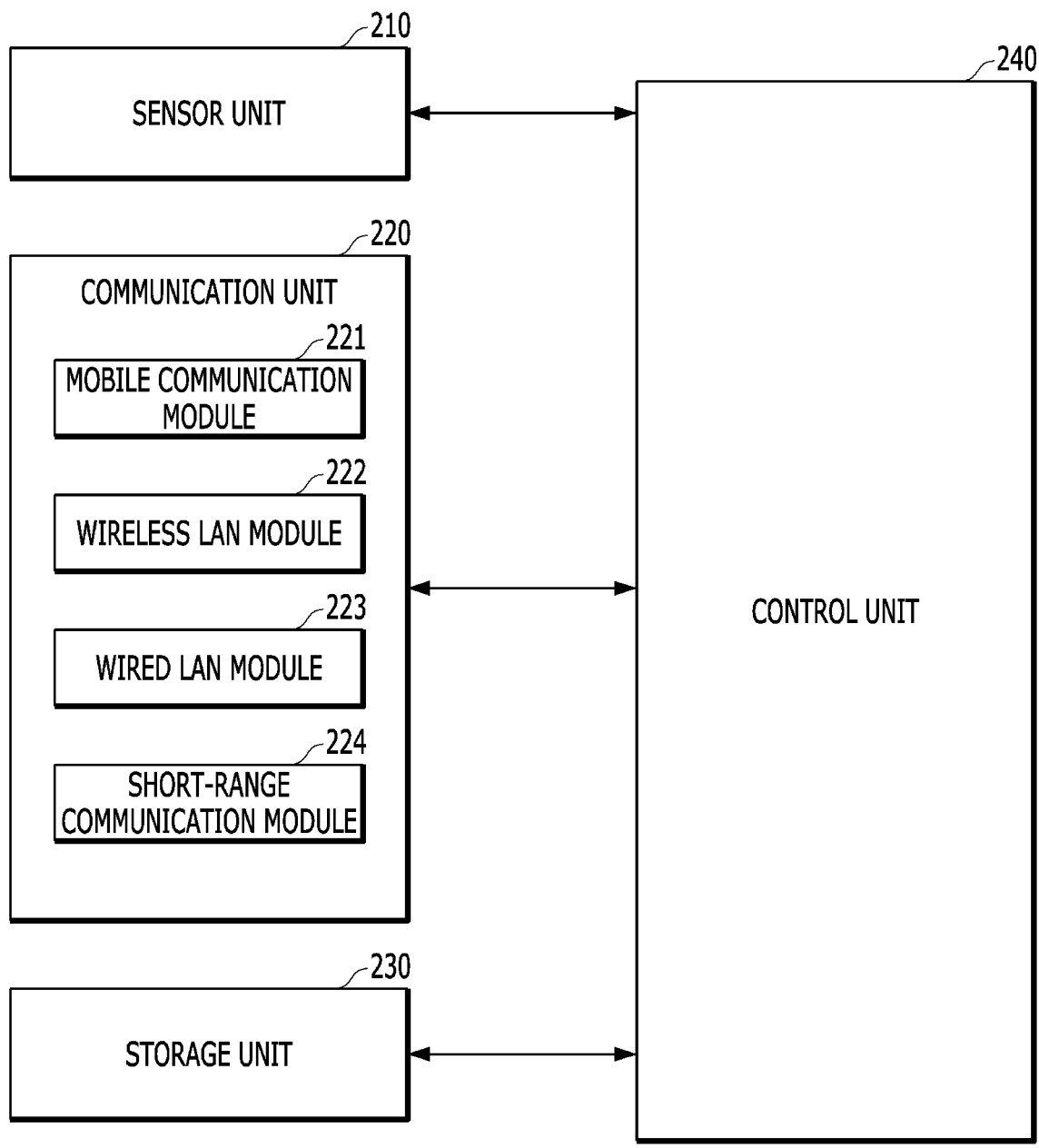
FIG. 2 is a diagram illustrating a detailed structure of an IoT device according to an embodiment of the present invention.

FIG. 2 is a diagram illustrating a detailed structure of an IoT device according to an embodiment of the present invention.

Referring to FIG. 2, an IoT device 200 according to an embodiment of the present invention may include a sensor unit 210, a communication unit 220, a storage unit 230, and a control unit 240.

The sensor unit 210 may generate sensing data measured for a tangible object or a surrounding environment under the control of the control unit 240. For example, the sensor unit 210 may include a conventional sensor for generating sensing data with respect to a tangible object, such as a temperature sensor, a humidity sensor, a heat sensor, a gas sensor, an illuminance sensor, and an ultrasonic sensor, and a physical sensor for generating sensing data with respect to a surrounding environment, such as a remote motion detection sensor, a military aeronautical radar for ground surveillance, a radar, a position sensor, a motion sensor, and an image sensor.

In addition, the sensing data generated by the sensor unit 210 may be transmitted to at least one context-aware server 41 of the cloud layer 40 in real time through the communication unit 220 under the control of the control unit 240.

The communication unit 220 may include at least one of a mobile communication module 221, a wireless LAN module 222, a wired LAN module 223, and a short-range communication module 224.

In addition, the communication unit 220 may be connected to at least one gateway device 21a, 21b, 21c, and 21d of the gateway 20 connected to the Internet network 30 under the control of the control unit 240, and may transmit and receive data to and from at least one context-aware server 41 of the cloud layer 40.

The control unit 240 may control the operation of at least one sensor of the sensor unit 210, so that the storage unit 230 stores sensing period information indicating a period for acquiring the sensing data beforehand.

In addition, the storage unit 230 may store context-aware regulation information beforehand under the control of the controller 240. The context-aware regulation information may mean information including data indicating reference regulations to be referred to for context-aware data processing.

In addition, the storage unit 230 may store a context-aware real-time processing threshold value according to the control of the controller 240. The context-aware real-time processing threshold value may be determined according to the specification of each IoT device. That is, the real-time processing threshold value is determined beforehand by considering at least one of a computing capability of the control unit 240, a read/write speed of the storage unit 230, a storage capacity of the storage unit 230, a communication speed of the communication unit 220, and resources that are fixedly required to control the components by the control unit 240.

In addition, the storage unit 230 may further store standardized interface information beforehand according to the control of the controller 240. The standardized interface information may include information for improving characteristics of the sensor unit 210. That is, the interface information may include interface information capable of adjusting inherent characteristics of the sensor, such as sensing sensitivity of the sensor unit 210, amplification gain, and output power.

In addition, the storage unit 230 may store ID information, which is unique identification information that can be distinguished from other IoT devices, under the control of the control unit 240. The ID information may be preset by a manufacturer or a user. In addition, the ID information may be assigned and set by the gateway 20 or the context-aware server 41 of the cloud layer 40.

The control unit 240 may generate a context tile based on the sensing data generated by the sensor unit 210 and the context-aware regulation information previously stored in the storage unit 230. In addition, the context tile may mean result data generated in the context-aware processing process performed by itself in each IoT device of the IoT network layer 10. In addition, the context tile may mean the smallest unit data among the context information that is referred to in the context-aware processing process performed by the context-aware server 41 of the cloud layer 40.

More specifically, the control unit 240 may perform a sensing data acquisition process of acquiring sensing data by controlling the sensing unit 210 to generate sensing data through at least one sensor included in the sensor unit 210 according to the sensing period previously stored in the storage unit 230. The acquired sensing data may be cumulatively stored in the storage unit 230 in time order under the control of the control unit 240. For example, when the sensing period previously stored in the storage unit 230 is 10 seconds, the control unit 240 may acquire sensing data by controlling the temperature sensor of the sensor unit 210 every 10 seconds to generate sensing data indicating a temperature measured for a surrounding environment or a specific object of the IoT device 200.

Then, the control unit 240 may perform a context-aware processing process based on the sensing data accumulated in the storage unit 230 and the context-aware regulation information previously stored in the storage unit 230, and generate a context tile as the result data. That is, the context tile may include information indicating the result data of the context-aware processing process performed on the IoT device. More specifically, the control unit 240 may perform a context-aware processing process based on the previous sensing data (sensing data generated 10 seconds before a current time) stored in the storage unit 230, the current sensing data, and the previously stored context-aware regulation information, and generate, as the result data, a context tile including information indicating one of "rise in temperature", "keep temperature", and "drop in temperature" as the temperature state of the surrounding environment of the IoT device 200 or a specific object. At this time, the control unit 240 may generate a context tile so that at least one of ID information and context tile generation time information previously stored in the storage unit 230 is further included. For example, the context tile generated by the control unit 240 may include information of "sT101@160502T153059#01F76". "sT101" may mean a context tile generated through the context-aware processing process by referring to the sensing data acquired by the temperature sensor when the ID information stored in the storage unit 230 is 101 and the notation of the temperature sensor (not illustrated) of the sensor unit 210 is defined as sT. In addition, "160502" after "@" may mean year and month in a "YYMMDD" format. That is, "160502" may mean the date when the context tile was created. In addition, "153059" after "T" may mean hour, minute, and second in an "HHMMSS" format. That is, "153059" may mean the time at which the context tile was created. In addition, "01" after "#" may mean context information (for example, 00: keep temperature, 01: rise in temperature, 10: drop in temperature, 11: error). In addition, "F" may mean that the measured temperature is Fahrenheit or Celsius. In addition, "76" after "F" may mean information of the measured temperature.

In addition, the context tile generated by the control unit 240 may be reused as context information referred to in a context-aware processing process performed by other IoT device or the context-aware server 41. For example, the control unit 240 may transmit the generated context tile to at least one context-aware server 41 of the cloud layer 40 through the communication unit 220. The context tile may be referred to as context information again in performing the context-aware processing process of the IoT device 200 that has transmitted the corresponding context tile in the context-aware server 41. In addition, the context-aware server 41 may use the context tiles received from the IoT device 200 as element information in a tagging processing process. As another example, the control unit 240 may distribute the generated context tile to at least one other IoT device through the IoT network to which the corresponding IoT device 20 belongs. The other IoT device may refer to the received context tile as the context information in performing the context-aware processing process.

In addition, the control unit 240 may generate the context information including the context tile.

In addition, the control unit 240 may perform the context-aware processing process based on the generated context information to generate context-aware result information as result data.

In addition, the control unit 240 may determine at least one operation information corresponding to the generated context-aware result information among the plurality of operation information previously stored in the storage unit 230, and may support to perform an operation corresponding to the determined at least one operation information.

In addition, the control unit 240 may transmit sensing data acquired in real time from the sensor unit 210 to at least one other IoT device connected to the IoT network formed through the gateway 20 or the cloud layer 40 connected through the Internet network 30 connected to the gateway 20.

More specifically, a processing procedure for a basic operation of an IoT device and a processing procedure for an IoT device that receives control information from a cloud layer will be described with reference to FIGS. 4 and 5.

Figure 4:
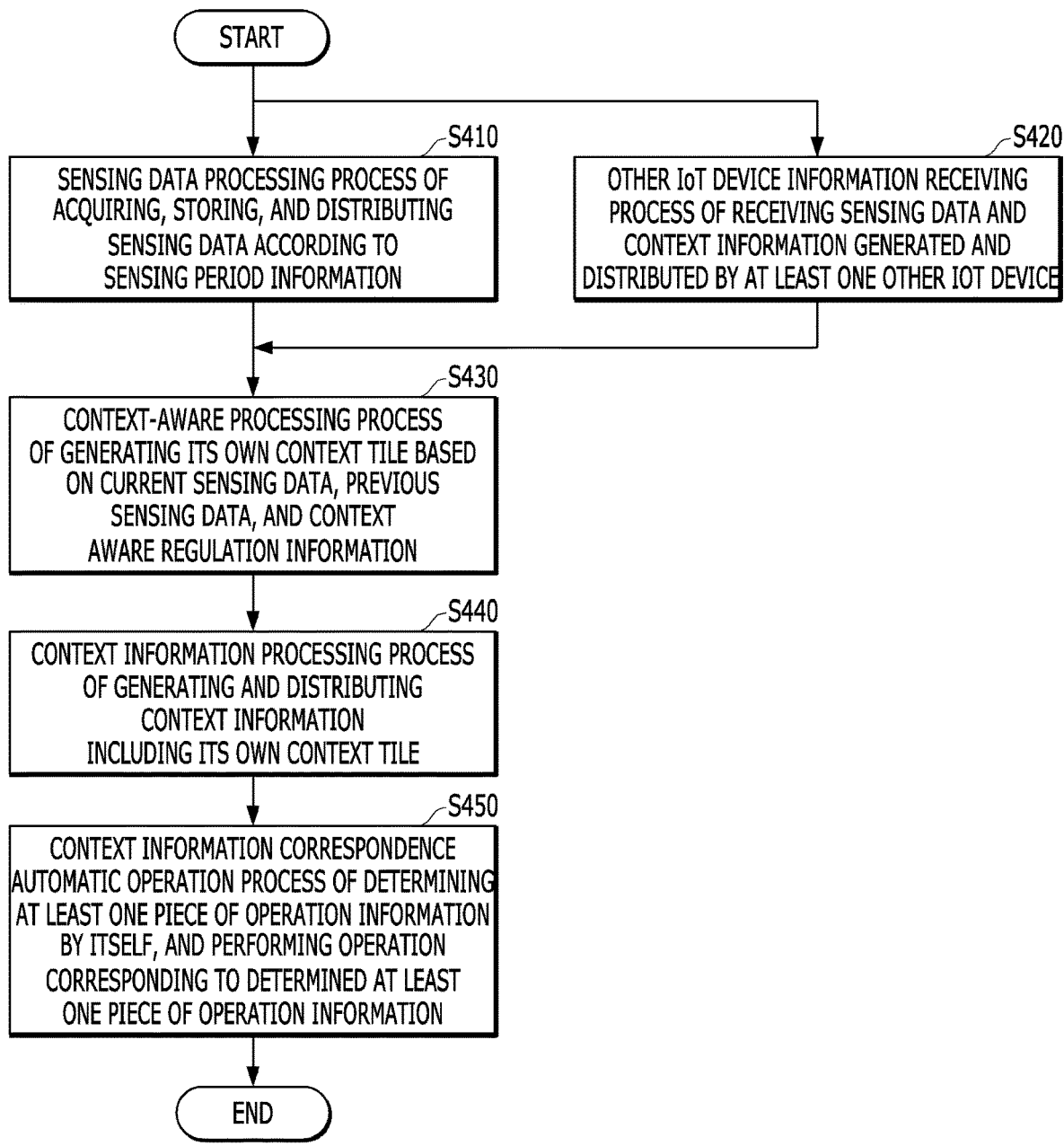
FIG. 4 is a diagram illustrating a processing procedure for a basic operation of an IoT device according to an embodiment of the present invention.

FIG. 4 is a diagram illustrating a processing procedure for a basic operation of an IoT device according to an embodiment of the present invention.

Referring to FIG. 4, the control unit 240 of the IoT device 200 according to the embodiment of the present invention may perform a sensing data processing process S410 of acquiring, storing, and distributing sensing data according to sensing period information.

More specifically, the control unit 240 may control the operation of at least one sensor of the sensor unit 210 according to a sensing period indicated by the sensing period information previously stored in the storage unit 230 to generate sensing data and acquire the sensing data in the sensor unit 210. In addition, the control unit 240 may support accumulation of the sensing data acquired for the sensing period according to a time order generated in the storage unit 230.

In addition, the control unit 240 may distribute the acquired sensing data in real time to the cloud layer 40 connected to at least one other IoT device or the gateway 20 through the Internet 30 in the IoT network formed through the gateway 20.

In addition, the control unit 240 may perform other IoT device information receiving process S420 of receiving sensing data and context information generated and distributed by at least one other IoT device.

More specifically, the control unit 240 may receive sensing data and context information generated and distributed by at least one other IoT device through the communication unit 220 in the IoT network formed with at least one other IoT device connected to the gateway 20.

Then, the control unit 240 may perform a context-aware processing process S430 of generating its own context tile based on current sensing data, previous sensing data (sensing data generated before the time indicated by the period information from the time when the current sensing data is generated), and context-aware regulation information.

In addition, in the context-aware processing process S430, the control unit 240 may generate its own context tile by further referring to the sensing data and the context information received from at least one other IoT device in the other device information receiving process S420.

Then, the control unit 240 may perform a context information processing process S440 of generating and distributing context information including its own context tile generated in the context-aware processing process S430.

Then, the control unit 240 may perform a context information correspondence automatic operation process S450 of performing a context-aware processing process based on the context information generated in the context-aware processing process S440 to generate context-aware result information as result data, determining at least one piece of operation information corresponding to the generated context-aware result information among a plurality of operation information previously stored in the storage unit 230, and performing an operation corresponding to the determined at least one piece of operation information.

In addition, in the context information correspondence automatic operation process S450, the control unit 240 may determine operation information by referring to the sensing data and the context information of at least one other IoT device, which are acquired in the other device information receiving process S420.

Figure 5:
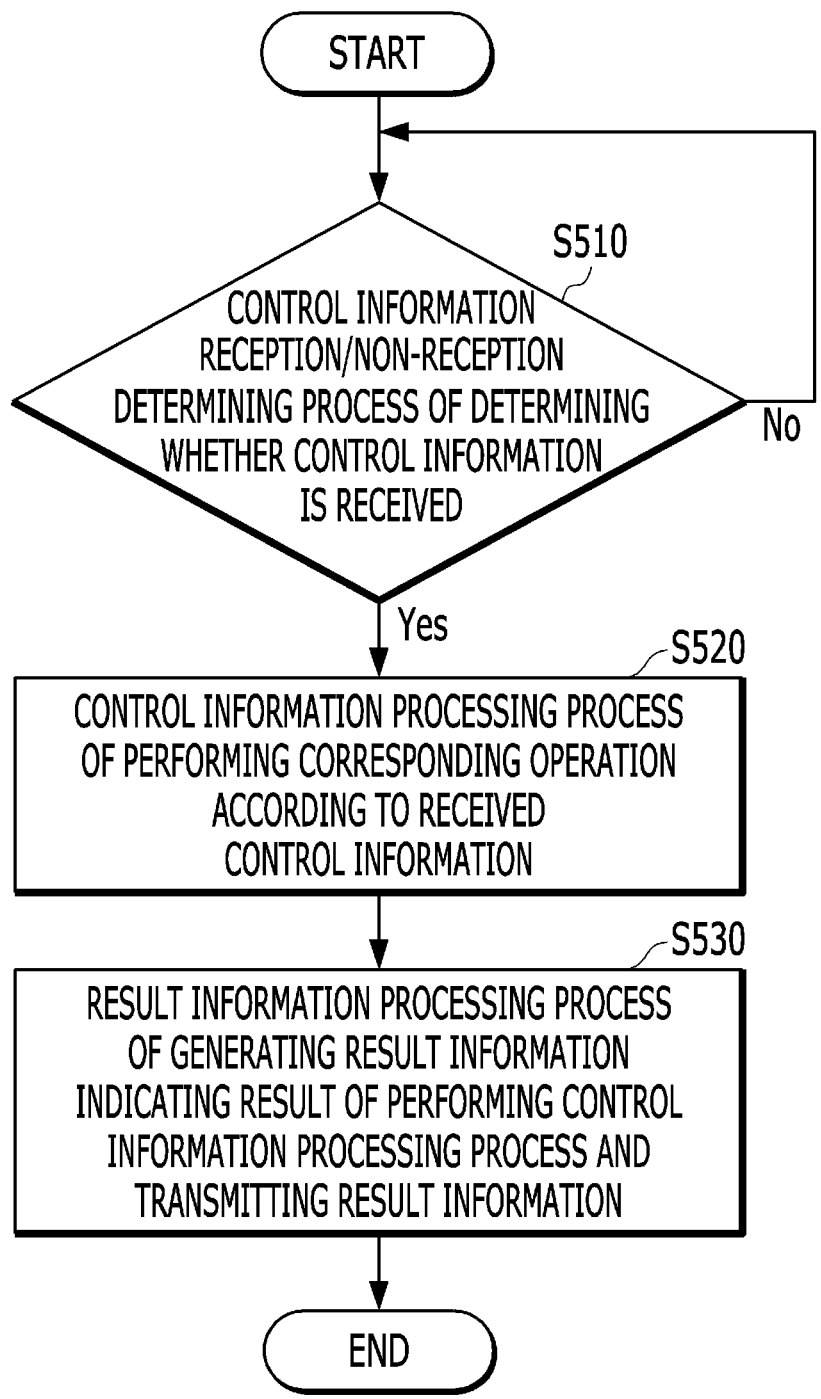
FIG. 5 is a diagram illustrating a processing procedure of an IoT device receiving control information from a cloud layer according to an embodiment of the present invention.

FIG. 5 is a diagram illustrating a processing procedure of an IoT device receiving control information from a cloud layer according to an embodiment of the present invention.

Referring to FIG. 5, the IoT device 200 according to the embodiment of the present invention is connected to the cloud layer 40 through the gateway 20 and the Internet network 30 and is in a state capable of transmitting and receiving data.

The control unit 240 of the IoT device 200 according to the embodiment of the present invention may perform a control information reception/non-reception determining process S510 of determining whether the control information is received.

More specifically, the control unit 240 may determine whether the control information transmitted from the control server 44 of the cloud layer 40 connected to the IoT device 200 has been received through the communication unit 220. The control server 44 may generate the control information including at least one of ID information capable of specifying at least one IoT device among a plurality of IoT devices connected to the IoT network and information instructing the specified IoT device to perform at least one of a plurality of operations that can serve a user.

As a result of the determination, when the control information is received, the control unit 240 may perform a control information processing process S520 of performing a corresponding operation according to the received control information. Meanwhile, when the control information is not received, the control unit 240 may proceed to the control information reception/non-reception determining process S510 and perform the corresponding process.

Then, the control unit 240 may perform a result information processing process S530 of generating result information indicating the result of performing the control information processing process S520 and transmitting the result information to the cloud layer 40. The control unit 240 may generate the result information including whether at least one operation corresponding to the ID information and the control information of the IoT device 200 previously stored in the storage unit 230 has been normally performed.

A processing procedure of an IoT device in case that a degree of load on data processing according to the embodiment of the present invention exceeds a real-time processing threshold value will be described below.

Figure 6:
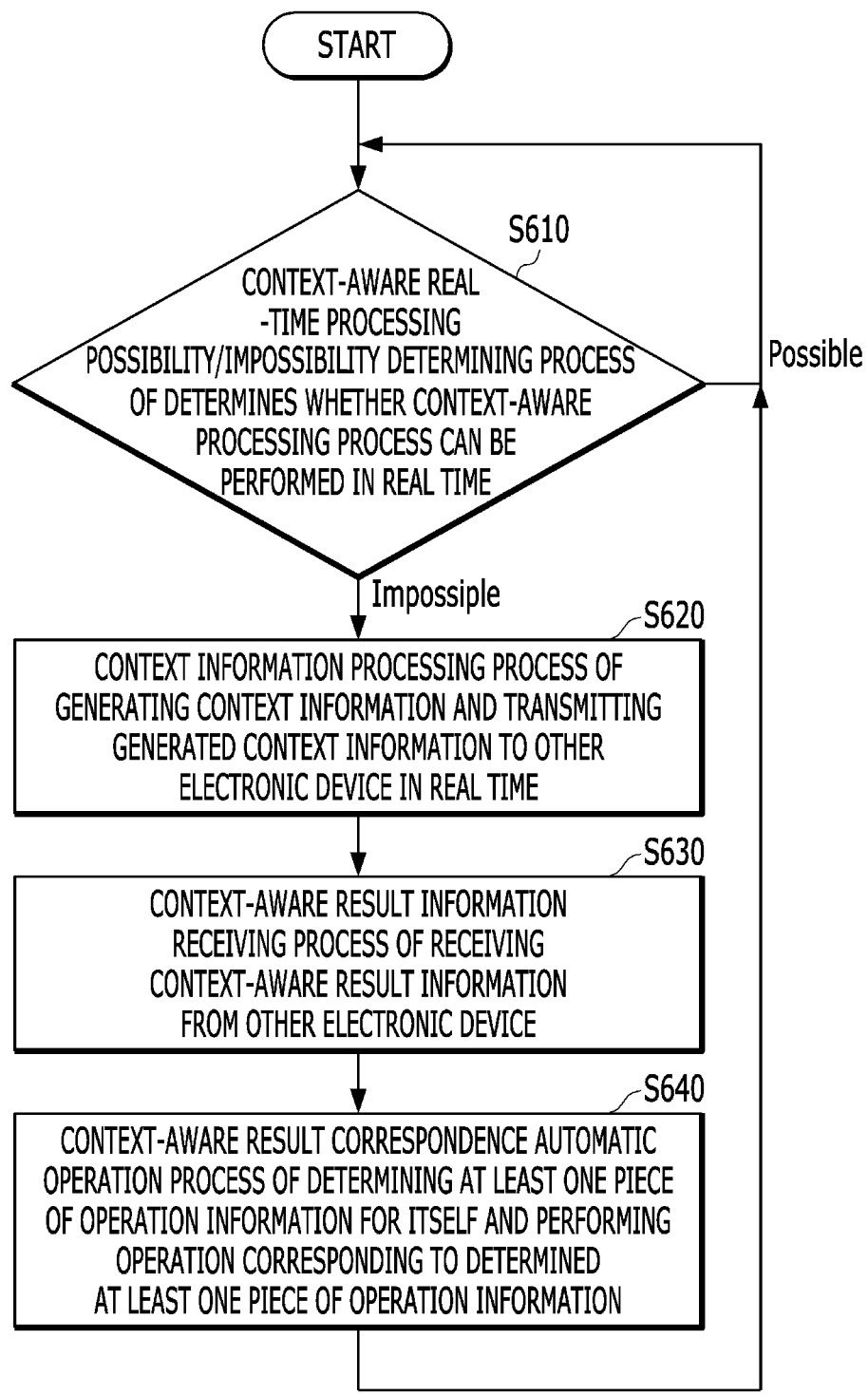
FIG. 6 is a diagram illustrating a processing procedure of an IoT device when a load for data processing exceeds a real-time processing threshold value according to an embodiment of the present invention.

FIG. 6 is a diagram illustrating a processing procedure of an IoT device when a load for data processing exceeds a real-time processing threshold value according to an embodiment of the present invention.

Referring to FIG. 6, the control unit 240 of the IoT device 200 according to the embodiment of the present invention may perform a context-aware real-time processing possibility/impossibility determining process S610 of determines whether the context-aware processing process can be performed in real time by comparing whether the degree of the load occurring according to the current data processing exceeds a real-time processing threshold value previously stored in the storage unit 230.

As a result of the determination, when the degree of the load exceeds the real-time processing threshold value, the control unit 240 may determine that the context-aware processing process cannot be performed in real time, and perform a context information processing process S620 of generating context information for context-aware processing and transmitting the generated context information to other electronic device in real time. The other electronic device may include at least one of an electronic device in the cloud layer 40, other IoT device in the IoT network, and a gateway device of the gateway 20. If the degree of the load does not exceed the real-time processing threshold value, the control unit 240 may proceed to the context-aware real-time processing possibility/impossibility determining process S610 and perform the corresponding process again.

Figure 7:
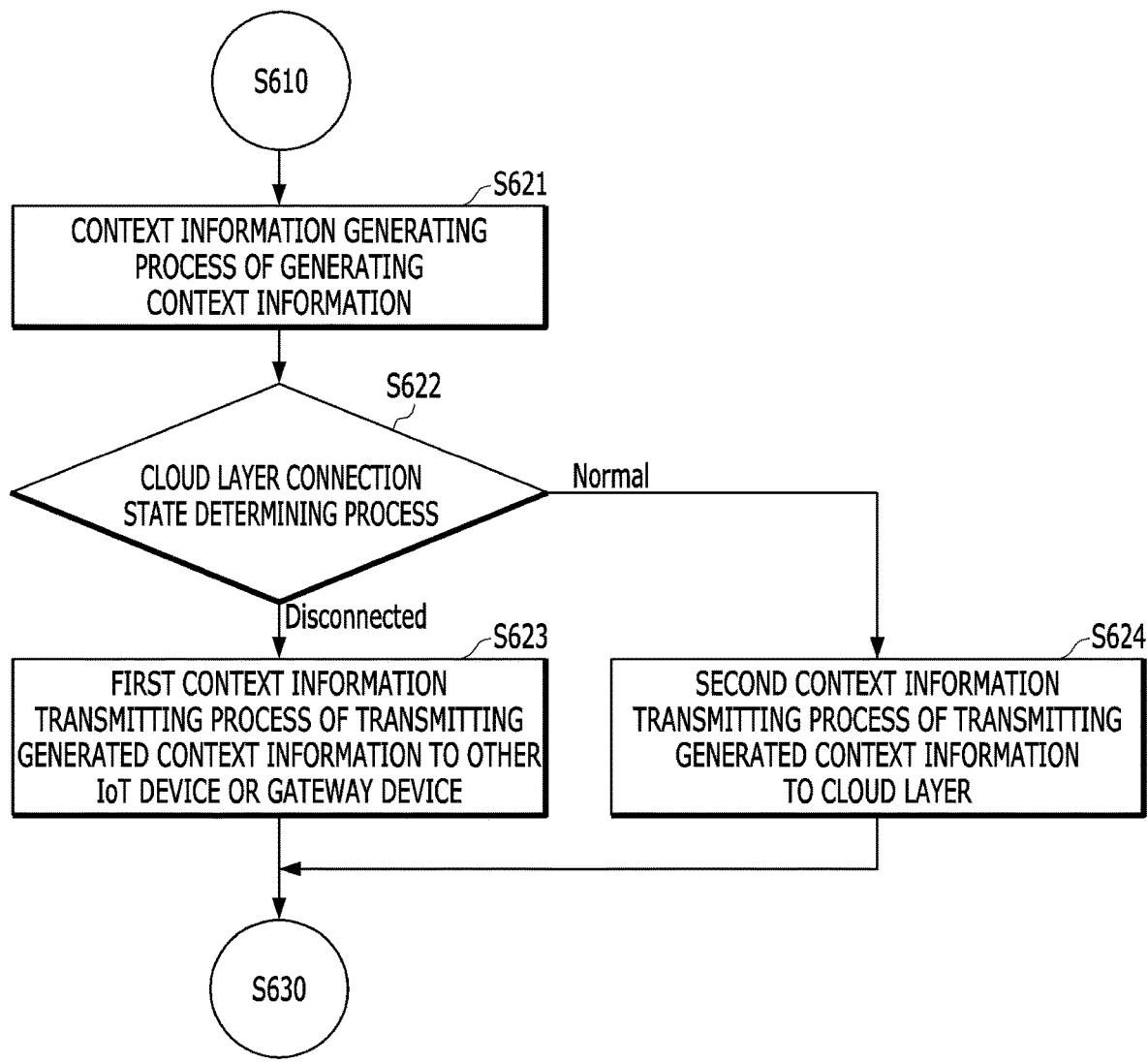
FIG. 7 is a diagram illustrating a processing procedure of a context information processing process according to an embodiment of the present invention.

More specifically, the context information processing process S620 of the IoT device according to the embodiment of the present invention may further include processes illustrated in FIG. 7.

FIG. 7 is a diagram illustrating a processing procedure of a context information processing process according to an embodiment of the present invention.

Referring to FIG. 7, the control unit 240 of the IoT device 200 according to the embodiment of the present invention may perform a context information generating process S621 of generating context information for context-aware processing. The control unit 240 may generate the context information including ID information previously stored in the storage unit 230 and its own context tile generated for the context-aware processing process. In addition, the control unit 240 may generate the context information further including sensing data acquired in real time by the sensor unit 210.

Then, the control unit 240 may perform a cloud layer connection state determining process S622 of determining a connection state for data transmission and reception with the cloud layer 40.

When it is determined that the connection for data transmission and reception with the cloud layer 40 is disconnected, the control unit 240 may perform a first context information transmitting process S623 of transmitting the context information generated in the context information generating process S621 to at least one of other IoT device of the IoT network layer 10 or the gateway device of the gateway 20.

When it is determined that the connection for data transmission and reception with the cloud layer 40 is normal, the control unit 240 may perform a second context information transmitting process S624 of transmitting the context information generated in the context information generating process S621 to the cloud layer 10.

Then, the control unit 240 may perform a context-aware result information receiving process S630 of receiving the context-aware result information as response information for the context information transmitted in the context information processing process S620 from the other electronic device that has received the context information. The context-aware result information may include result data of the context-aware processing process performed by other electronic device on behalf of the IoT device 200. In addition, other electronic device may generate the context-aware result information including the ID information included in the context information generated in the context information processing process S620. Therefore, other electronic device can transmit the context-aware result information by specifying the IoT device 200 that has transmitted the context information to the other electronic device itself.

Then, the control unit 240 may perform a context-aware result information correspondence automatic operation process S640 of determining at least one piece of operation information among a plurality of operation information previously stored in the storage unit 230 of the IoT device 200 based on the received context-aware result information and performing an operation corresponding to the determined at least one piece of operation information.

In addition, in the context information correspondence automatic operation process S630, the control unit 240 may determine the operation information by additionally referring to the sensing data and the context information of at least one other IoT device, which are acquired in the other device information receiving process S420 described with reference to FIG. 4.

Then, the control unit 240 may proceed to the context-aware real-time processing possibility/impossibility determining process S610 and perform the process again.

In addition, the processes S610 to S630 performed by the control unit 240 may be performed from a time point when the degree of the load exceeds the real-time processing threshold value to a time point when the degree of the load has a value within a real-time processing threshold value range.

As described above, the IoT device 200 according to the embodiments of the present invention may basically perform its own context-aware processing process in real time when the degree of the load has a value within the real-time processing threshold value range.

Meanwhile, when the degree of the load exceeds a value within the real-time processing threshold value range, the IoT device 200 may support the context-aware processing process to be processed by other electronic device, and may receive the context-aware result information from other electronic device and provide a service to a user in real time.

Figure 3:
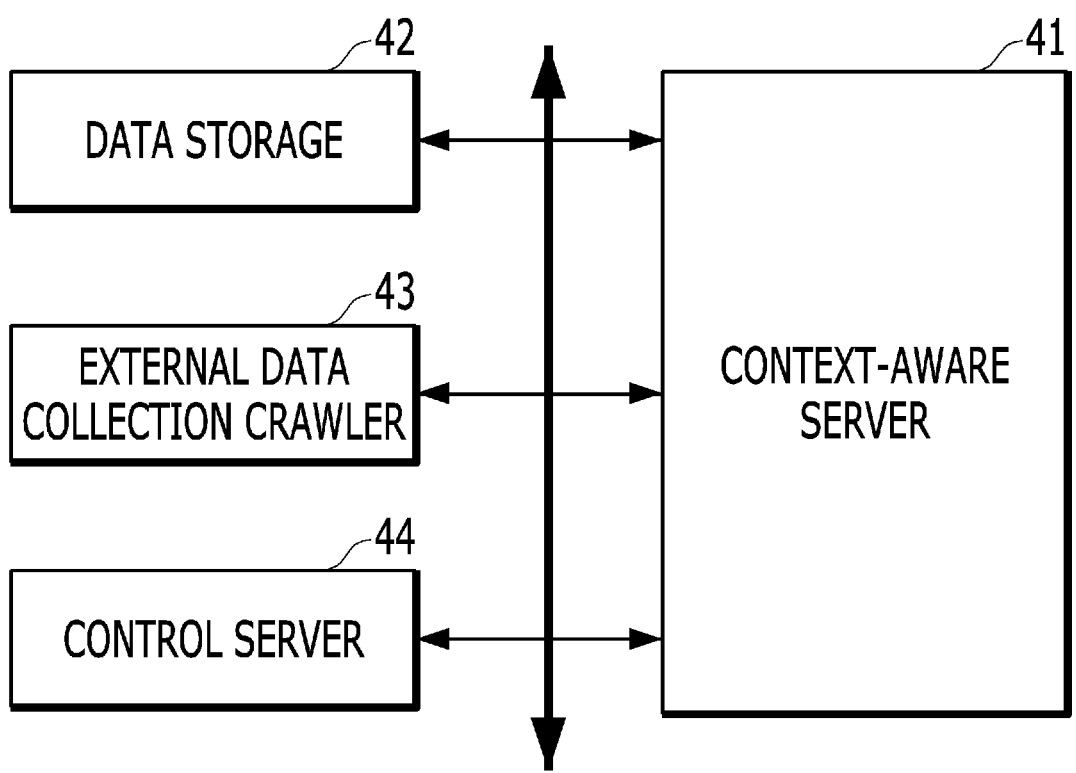
FIG. 3 is a diagram illustrating a detailed structure of a cloud layer according to an embodiment of the present invention.

FIG. 3 is a diagram illustrating a detailed structure of a cloud layer according to an embodiment of the present invention.

Referring to FIG. 3, the cloud layer 40 according to the embodiment of the present invention may include a data storage 42, an external data collection crawler 43, a control server 44, and a context-aware server 41.

The data storage 42 may store information transmitted or collected from the IoT devices 11a, 11b, and 11c of the IoT network layer 10 to the cloud layer 40 through the gateway 20 and the Internet network 30.

The external data collection crawler 43 may collect opened external data that can be referred to in the determining process of the context-aware processing process performed by the context-aware server 41. For example, the external data may include logical environmental information such as weather information.

In addition, the external data collection crawler 43 may perform an external data cleaning process of selecting data that can be actually referred to in the context-aware processing process of the context-aware server 41 among the collected external data, and generate cleaned external data as result data.

In addition, the external data collection crawler 43 may transmit the cleaned external data to the data storage 42 and support the cleaned external data to be stored therein. The cleaned external data previously stored in the data storage 42 may be referred to by the context-aware server 41 when necessary during the determining process of the context-aware processing process.

More specifically, when the context-aware server 41 performs the context-aware processing process, the result data processed with referring to the cleaned external data generated by the external data collection crawler 43 and then stored in the data storage 42 may be more accurate than the result data processed without referring to the cleaned external data.

When command information of an administrator (user) is received from at least one of the IoT devices of the IoT network layer 10, the control server 44 may generate and transmit control information of the IoT device to the IoT network layer 10 so that the IoT device performs an operation corresponding to the received command information of the administrator. The command information may include ID information of a specified IoT device and control information for controlling a specified operation to be performed.

In addition, the control server 44 may receive, as response data, result information indicating whether the operation is performed according to the control information from the corresponding IoT device received the control information of the IoT device, and the result of the operation. In addition, the control server 44 may support the received result information to be transmitted to the data storage 42 and stored therein. The result information stored in the data storage 42 may be referred to by the context-aware server 41 as necessary during the context-aware processing process.

When the context information is received from at least one IoT device in the IoT network layer 10, the context-aware server 41 may perform the context-aware processing process based on the information stored in the data storage 44, and then generate context-aware result information which is information indicating the processing result of the context-aware processing process. Then, the context-aware server 41 may transmit the context-aware result information to at least one specific IoT device of the IoT network layer 10 through the gateway 20 connected to the Internet network 30. In addition, the context-aware server 41 may support the generated context-aware result information to be transmitted to the data storage 42 and stored therein. The context-aware result information stored in the data storage 42 may be referred to by the context-aware server 41 when necessary during the context-aware processing process.

More specifically, a processing procedure of a cloud layer according to an embodiment of the present invention will be described with reference to FIG. 8.

Figure 8:
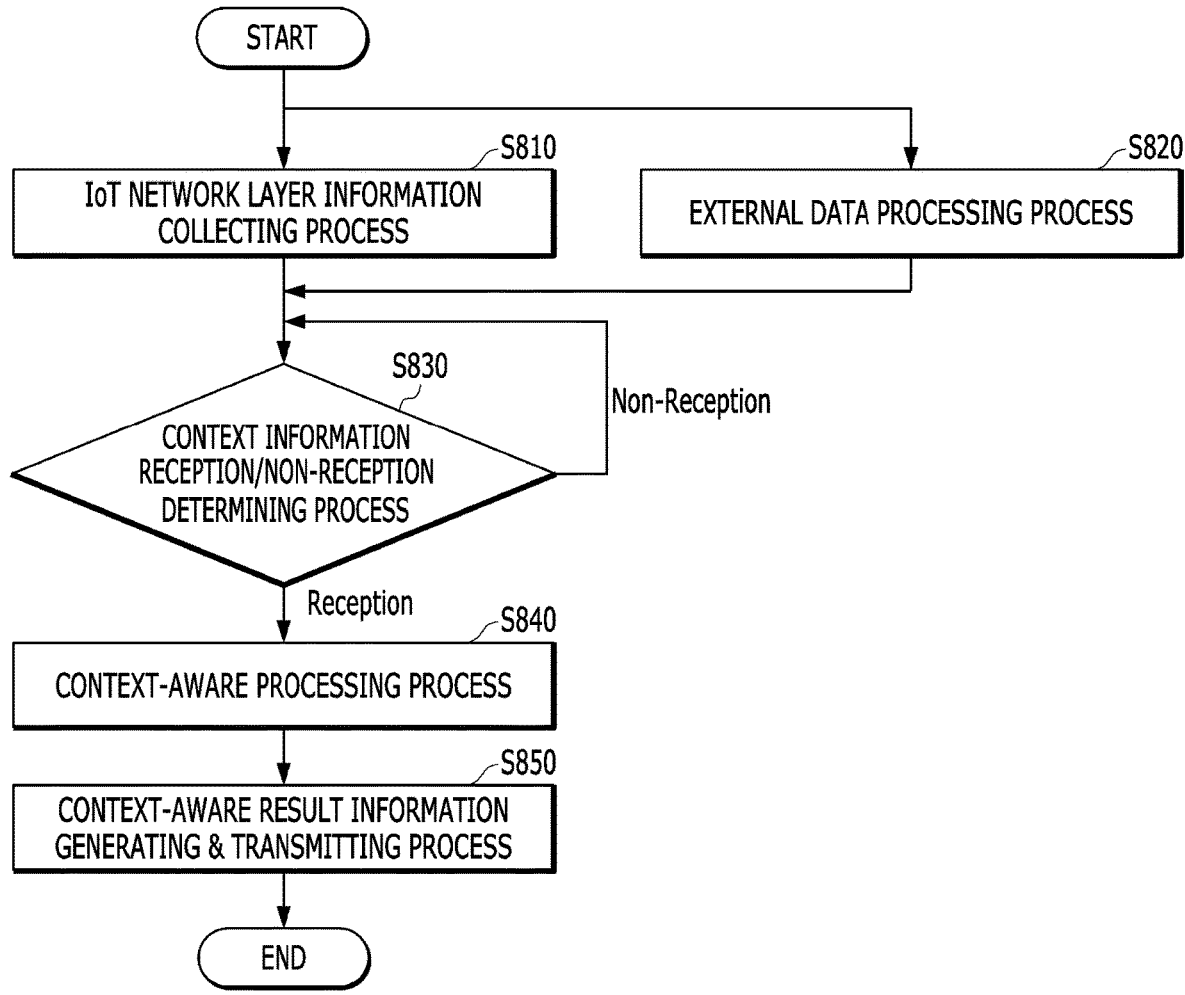
FIG. 8 is a diagram illustrating a processing procedure of a cloud layer according to an embodiment of the present invention.

FIG. 8 is a diagram illustrating a processing procedure of a cloud layer according to an embodiment of the present invention.

Referring to FIG. 8, the data storage 42 of the cloud layer 40 according to the embodiment of the present invention may perform an IoT network layer information collecting process S810 of collecting sensing data and context information transmitted from the IoT network layer 10.

In addition, the external data collection crawler 43 of the cloud layer 40 according to the embodiment of the present invention may perform an external data processing process S820 of collecting and cleaning external data opened to the public through the Internet network 30 and generating cleaned external data as the result data.

Figure 9:
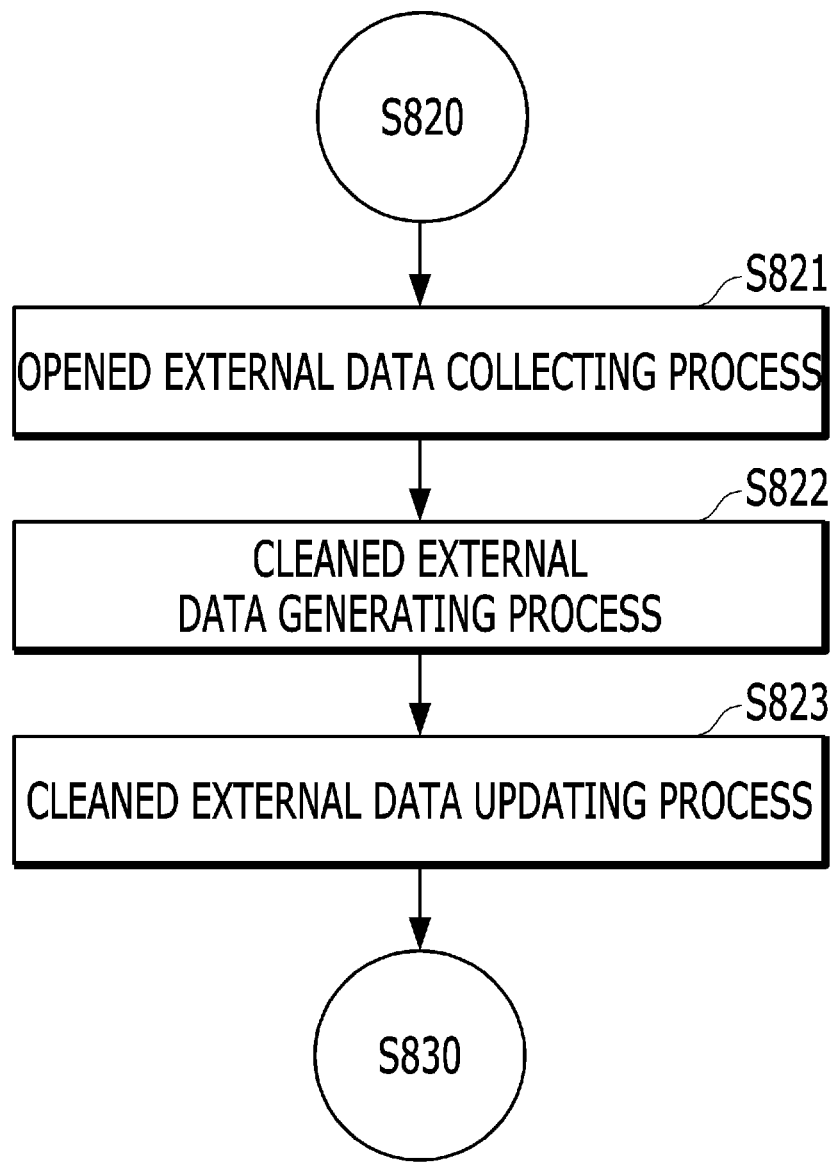
FIG. 9 is a diagram showing a processing procedure of an external data processing process according to an embodiment of the present invention.

More specifically, the external data processing process S820 of the external data collection crawler of the cloud layer according to the embodiment of the present invention may further include processes illustrated in FIG. 9.

FIG. 9 is a diagram showing a processing procedure of an external data processing process according to an embodiment of the present invention.

Referring to FIG. 9, the external data collection crawler 43 of the cloud layer 40 according to the embodiment of the present invention may perform an opened external data collecting process S821 of collecting external data opened to the public through the Internet network 30.

Then, the external data collection crawler 43 may perform a cleaned external data generating process S822 of selecting data that can be actually referred to in the context-aware processing process S840 performed by the context-aware server 41 described below based on the collected opened external data and generate cleaned external data as the result data.

Then, the external data collection crawler 43 may perform a cleaned external data updating process S823 of transmitting the generated cleaned external data to the data storage 42 and updating the previously stored cleaned external data.

After the IoT network layer information collecting process S810 and the external data processing process S820, the context-aware server 41 of the cloud layer 40 according to the embodiment of the present invention may perform a context information reception/non-reception determining process S830 of determining whether context information has been received from at least one IoT device of the IoT network layer 10.

As a result of the determination, when the context information is received, the context-aware server 41 may perform a context-aware processing process S840 of performing a context-aware processing process of at least one IoT device transmitted context information based on information stored in the data storage 44.

When the context information is not received, the context-aware server 41 may monitor whether context information is received.

More specifically, in the context-aware processing process S830, the context-aware server 41 may refer to at least one of the sensing data of each IoT device of the IoT network layer 10 previously stored in the data storage 44, the context file, the cleaned external data, and the context-aware result information which is the result data of the existing context-aware processing process S840.

Then, the context-aware server 41 may perform a context-aware result information generating and transmitting process S850 of generating context-aware result information which is the result data of the context-aware processing process S830 and transmitting the generated context-aware result information, as response data of the context information, to at least one IoT device transmitted the context information.

A processing procedure of a cloud layer according to an embodiment of the present invention will be described with reference to FIG. 10.

Figure 10:
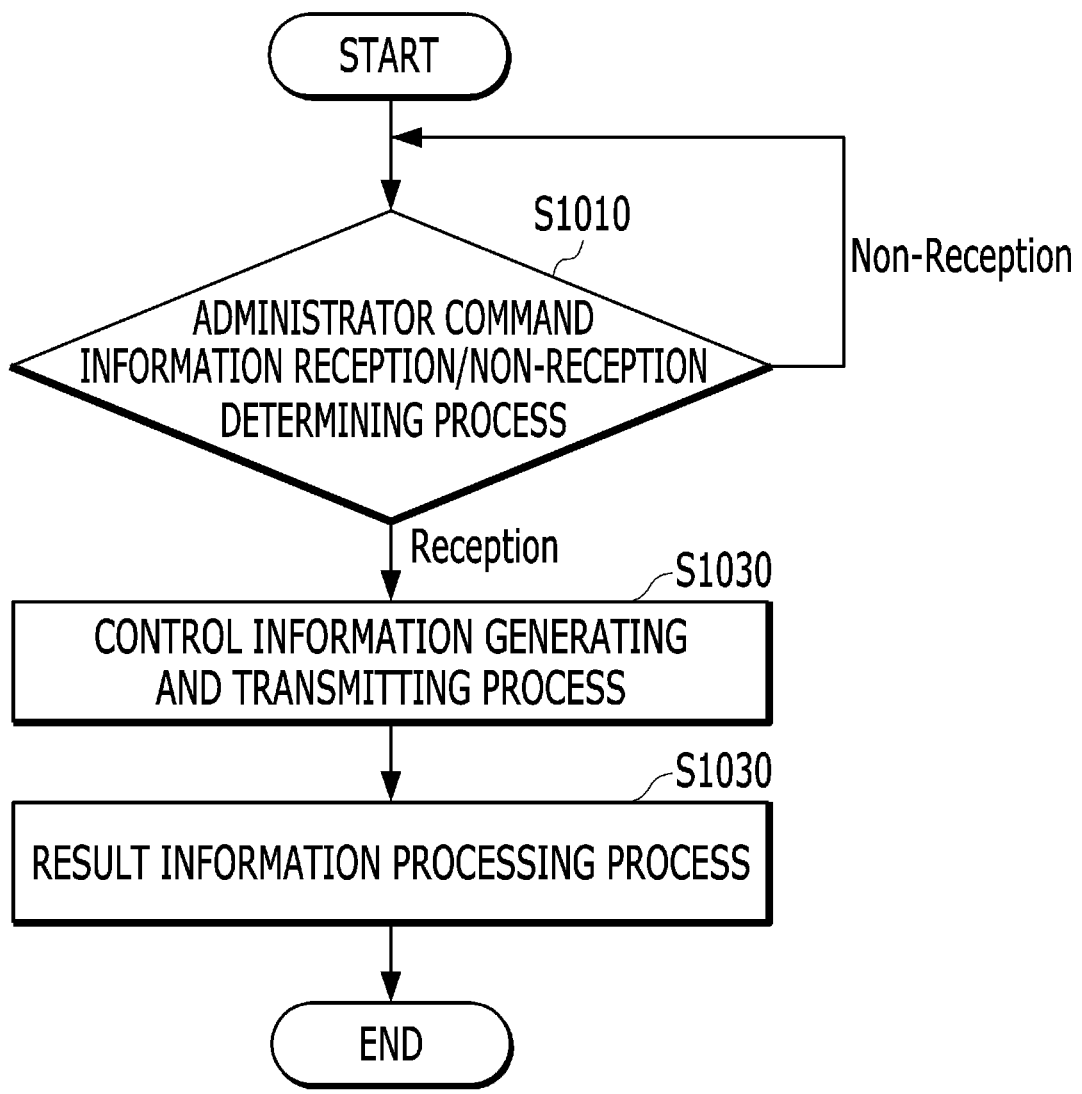
FIG. 10 is a diagram illustrating a processing procedure of a control server according to an embodiment of the present invention.

FIG. 10 is a diagram illustrating a processing procedure of a cloud layer according to an embodiment of the present invention.

Referring to FIG. 10, the control server 44 of the cloud layer 40 according to the embodiment of the present invention may perform an administrator command information reception/non-reception determining process S1010 of determining whether command information of an administrator (user) is received from at least one IoT device of the IoT network layer 10.

As a result of the determination, when the command information is received, the control server 44 may perform a control information generating and transmitting process S1020 of generating control information of the IoT device so that the IoT device transmitted the administrator command information performs the operation corresponding to the received administrator command information and to transmitting the generated control information to the IoT device. The command information may include ID information of a specified IoT device and control information for controlling a specified operation to be performed. Then, the control server 44 may perform a result information processing process S1030 of receiving, as response data, result information indicating whether the operation is performed according to the control information from the IoT device received the control information, and the result of the operation, and transmitting the received result information to the data storage 42 and storing the result information in the data storage 42, so that the context-aware server 41 refers to the received result information in performing the context-aware processing process of the IoT device transmitted the administrator command information.

Hereinafter, the following terms will be described for helping understand the context-aware system, method, and computer-readable recording medium for providing the intelligent service in the IoT environment according to the embodiments of the present invention.

The term "context" can generally be defined as "all information that can be used to specify certain objects or environments".

Therefore, it is apparent that the "context tile", "context information", and "context-aware result information" according to the embodiments of the present invention are included in the "context" indicating information used in the context-aware processing process by the context-aware server.

The embodiments set forth herein may be embodied as program instructions that can be executed by various computing units and recorded on a computer-readable recording medium. Examples of the computer-readable recording medium may include program instructions, data files, and data structures solely or in combination. The program instructions recorded on the non-transitory computer-readable recording medium may be specifically designed and configured for the inventive concept, or may be well known to and usable by those of ordinary skill in the field of computer software. Examples of the computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device specially configured to store and execute program instructions (e.g., a ROM, a random access memory (RAM), a flash memory, etc.). Examples of the program instructions may include not only machine language codes prepared by a compiler but also high-level codes executable by a computer by using an interpreter. The hardware device may be configured to operate as one or more software modules for performing the operation of the present invention, and vice versa.

In addition, it will also be appreciated that embodiments of the present invention may be implemented in hardware, software, or a combination of hardware and software. Any such software may be stored in a volatile or nonvolatile storage device such as ROM, a memory such as a RAM, memory chip, device, or integrated circuit, or a storage medium readable optically or magnetically recordable and readable by a machine (e.g., computer), such as CD, DVD, magnetic disk, or magnetic tape. It will be appreciated that the storage that may be included in an IoT device or a service server is an example of a machine-readable storage medium suitable for storing a program or programs including instructions for implementing the embodiments of the present invention. Accordingly, the present invention includes a program including codes for implementing the system or method described in any claim herein and a machine-readable storage medium storing such a program. Furthermore, such a program can be electronically transferred through any medium such as a communication signal transmitted through a wired or wireless connection, and the present invention appropriately includes equivalents thereof.

While specific embodiments have been described with reference to the figures, it will be understood by those of ordinary skill in the art that various changes in form and details may be made therein without departing from the spirit and scope as defined by the following claims.

What is claimed is:

1. A context-aware system for providing an intelligent service in an Internet of things (IoT) environment, the context-aware system comprising:
a plurality of IoT devices each comprising at least one sensor and a communication unit;
a gateway connected to the plurality of IoT devices to form an IoT network layer and comprising at least one gateway device connected to an Internet network; and
a cloud server layer which transmits and receives data to and from the plurality of IoT devices of the IoT network layer through the Internet network and the gateway,
wherein at least one IoT device, which is determined not to perform a context-aware processing process in real time among the plurality of IoT devices, generates context information, which is an essential component of the context-aware processing process, and transmits the generated context information to a context-aware server of the cloud server layer, and
the context-aware server performs the context-aware processing process of the IoT device transmitted the context information to generate context-aware result information as result data, transmits the generated context-aware result information again to the IoT device transmitted the context information, and performs support so that the IoT device receiving the context-aware result information performs at least one operation corresponding to the received context-aware result information,
wherein each of the plurality of IoT devices comprises:
a sensor unit comprising at least one sensor;
a communication unit connected to a gateway device of the gateway through a wired/wireless communication scheme to transmit and receive data with the cloud layer;
a storage unit which stores at least one of sensing period information indicating a period for controlling the operation of the at least one sensor to acquire sensing data, context-aware regulation information indicating reference regulations referred to for the context-aware processing process, a real-time processing threshold value which is a reference value when it is determined that the context-aware processing process cannot be processed in real time, standardized interface information for adjusting characteristics of the at least one sensor, and ID information which is unique identification information that can be distinguished from other IoT devices; and
a control unit which acquires the sensing data from the at least one sensor according to the sensing period information, distributes the acquired sensing data to at least one other IoT device or the cloud layer through the communication unit, generates a context tile, which is smallest unit data among context information, based on current sensing data, previous sensing data, and the context-aware regulation information acquired from the at least one sensor, generates context information including the generated context tile to distribute the generated context information to other IoT device or the cloud layer, generates context-aware result information as result data, by performing a context-aware processing process based on the generated context information, determines at least one operation information corresponding to the generated context-aware result information among a plurality of operation information previously stored in the storage unit, and controls an operation corresponding to the determined at least one operation information to be performed.

2. The context-aware system of claim 1, wherein
the control unit receives sensing data and context information generated by at least one other IoT device in the IoT network layer, and further refers to the received sensing data and context information of the at least one other IoT device in generating the context tile or performing the context-aware processing process.

3. The context-aware system of claim 1, wherein
when control information is received from a control server of the cloud layer, the control unit performs at least one operation indicated by at least one operation information corresponding to the received control information among the plurality of operation information previously stored in the storage unit, generates result information indicating the result of performing the at least one operation, and transmits the result information to the control server.

4. The context-aware system of claim 1, wherein when it is determined that the context-aware processing process cannot be performed in real time, the control unit determines a connection state with respect to the cloud layer, when it is determined that the connection is disconnected, transmits the generated context information to the at least one other IoT device or the at least one gateway device to perform the context-aware processing process by proxy, and acquires context-aware result information generated by the at the at least one other IoT device or the at least one gateway device.

5. The context-aware system of claim 1, wherein
the cloud layer comprises:
a data storage which receives and stores sensing data and context information transmitted from the plurality of IoT devices;
an external data collection crawler which collects external data opened through the Internet network and supports the external data to be stored in the data storage; and
a context-aware server which, when the context information is received from at least one of the plurality of IoT devices, generates context-aware result information as result data, by performing a context-aware processing process of the IoT device transmitted the context information based on information stored in the data storage, and transmits the generated context-aware result information to the IoT device transmitted the context information.

6. The context-aware system of claim 5, wherein
the external data collection crawler generates cleaned external data by selecting data that can be referred to among the collected external data when the context-aware server performs the context-aware processing process of the IoT device transmitted the context information, and supports the cleaned external data to be stored in the data storage.

7. The context-aware system of claim 5, further comprising a control server which, when administrator command information is received from at least one of the plurality of IoT devices, generates control information corresponding to the received administrator command information, transmits the generated control information to the at least one IoT device transmitted the administrator command information, and supports at least one operation corresponding to the control information to be performed.

8. The context-aware system of claim 7, wherein
the control server receives result information indicating a result of performing the operation from the at least one IoT device received the control information, and supports the received result information to be stored in the data storage so that the context-aware server can refer to the received result information in performing the context-aware processing process of the IoT device transmitted the context information.

9. A context-aware method for providing an intelligent service in an Internet of things (IoT) environment, the context-aware method comprising:
- a context-aware real-time processing possibility/impossibility determining process of determining whether an IoT device can perform a context-aware processing process in real time;
- a context information processing process of, when it is determined that the context-aware processing process cannot be performed in real time, generating context information for context-aware processing, and transmitting the generated context information to other electronic device in real time;
- a context-aware result information receiving process of receiving context-aware result information, which is result data for the context-aware processing process performed by the other electronic device; and
- a context-aware result information correspondence operation process of determining at least one piece of operation information corresponding to the received context-aware result information among a plurality of previously stored operation information and performing an operation corresponding to the determined at least one piece of operation information,
- wherein the context information processing process further comprises:
  - a context information generating process of generating the context information for the context-aware processing;
  - a cloud layer connection state determining process of determining a connection state for data transmission and reception with a cloud layer;
  - a first context information transmitting process of, when the connection for the data transmission and reception with the cloud layer is disconnected, transmitting the context information to at least one of other IoT devices of an IoT network layer or gateway devices of a gateway; and
  - a second context information transmitting process of, when it is determined that the connection for the data transmission and reception with the cloud layer is normal, transmitting the context information to the cloud layer,
- wherein the context information generating process comprises generating the context information including at least one of previously stored ID information, a context tile, which is smallest unit data among the context information, generated for the context-aware processing process, and sensing data acquired in real time by a sensor unit.

10. The context-aware method of claim 9, wherein the context-aware real-time processing possibility/impossibility determining process comprises determining whether a degree of a load occurring according to current data processing exceeds a previously stored real-time processing threshold value.

* * * * *